US010306107B2

(12) United States Patent
Liefferink (10) Patent No.: US 10,306,107 B2
(45) Date of Patent: May 28, 2019

(54) METHOD OF PRINTING FULL COLOUR IMAGES

(71) Applicant: Hauke Maritz Liefferink, Sandton (ZA)

(72) Inventor: Hauke Maritz Liefferink, Sandton (ZA)

(*) Notice: Subject to any disclaimer, the term of this patent is extended or adjusted under 35 U.S.C. 154(b) by 0 days.

(21) Appl. No.: 15/822,259

(22) Filed: Nov. 27, 2017

(65) Prior Publication Data

US 2018/0139353 A1 May 17, 2018

Related U.S. Application Data

(63) Continuation-in-part of application No. PCT/IB2017/052998, filed on May 22, 2017.

(30) Foreign Application Priority Data

May 30, 2016 (ZA) .................... 2016/03664

(51) Int. Cl.
*H04N 1/52* (2006.01)
*H04N 1/60* (2006.01)
*H04N 1/405* (2006.01)

(52) U.S. Cl.
CPC ............. *H04N 1/405* (2013.01); *H04N 1/52* (2013.01); *H04N 1/60* (2013.01); *H04N 1/6008* (2013.01)

(58) Field of Classification Search
CPC ........ H04N 1/405; H04N 1/6008; H04N 1/60; H04N 1/52
See application file for complete search history.

(56) References Cited

U.S. PATENT DOCUMENTS

2006/0082844 A1 4/2006 White
2012/0314260 A1 12/2012 Hakamada et al.

FOREIGN PATENT DOCUMENTS

CN 104320561 1/2015

OTHER PUBLICATIONS

International Preliminary Report on Patentability (IPRP), International Application No. PCT/IB2017/052998, dated Dec. 4, 2018.

*Primary Examiner* — Christopher Wait
(74) *Attorney, Agent, or Firm* — Nixon & Vanderhye P.C.

(57) ABSTRACT

The invention relates to a method of colour separation and printing full colour images, directly onto a substrate, in such a way that no ink trapping or the use of semi-transparent or transparent inks is required, and without requiring ink drying between ink stations. In particular, the method provides the steps of using non-transparent, semi-transparent, or transparent inks; half-toning (i.e. screening) separated CMYK digital image files to 1-bit files; creating additional ink colour channels from the 1-bit CMYK separated files; and performing removal of trapped or inked areas that will be overprinted, utilising the 1 bit files.

14 Claims, 8 Drawing Sheets
(8 of 8 Drawing Sheet(s) Filed in Color)

C50 C100 M50 M100 Y50 Y100 K50 K100 MY CY CM CMY

METHOD OF PRINTING FULL COLOUR IMAGES

CROSS-REFERENCE TO RELATED APPLICATIONS

This application is a continuation-in-part (CIP) of PCT/1620178/052998 filed on 22 May 22, 2017 which claims priority from South African Application Serial No. 2016/03664 filed on 30 May 2017, the entire contents of each such prior filed application being expressly incorporated hereinto by reference.

INTRODUCTION

This invention relates to a method of colour separation and printing full colour images, directly onto a substrate, in such a way that no ink trapping or the use of semi-transparent or transparent inks is required. Moreover, the method of the invention makes it possible to print such full colour images using no more than 100% Total Area Cover ("TAC").

BACKGROUND TO THE INVENTION

Colour separation, full colour printing, colour illustration, colour representation and colour manipulation are essential features of the invention. It is therefore of paramount importance that the specification and accompanying colour figures are interpreted against this background.

In printing processes, whether it be so-called conventional printing (e.g. flexographic, rotogravure, lithographic or silk-screen printing), or digital printing (e.g. inkjet, laser or toner printing), full colour printing onto a substrate is generally accomplished using four primary colours, namely Cyan, Magenta, Yellow and Black, which are collectively abbreviated in the trade as "CMYK". These colours generally conform to an ISO standard specifying colour characteristics and tone value increase curves ("TVI") for the respective inks.

To a lesser degree, printing in full colour can be accomplished using additional primary colours to increase a colour gamut. In this instance, CMYK may be enhanced by adding appropriate Orange, Green or Violet inks. A combination of Cyan, Magenta, Yellow, Black, Orange, Green and Violet inks is collectively abbreviated in the trade as "CMYKOGV". CMYK may also be enhanced by adding appropriate Red or Blue inks, in which case a combination of Cyan, Magenta, Yellow, Black, Red, Green and Blue inks is collectively abbreviated in the trade as "CMYKRGB". Other expanded or extended colour gamut processes may involve the use of other, but similar primaries to achieve gamut volume expansion.

Figure 13:
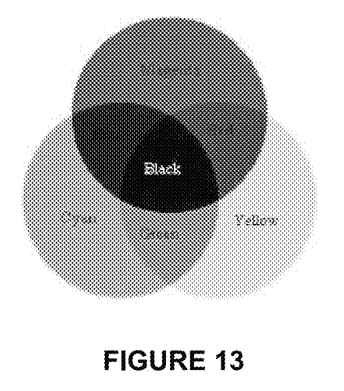
FIG. 13 is a conventional color diagram.

Whether printing with CMYK or extended gamut processes, it is essential that these inks not only deliver the appropriate colour, but that they are also transparent or semi-transparent, since trapping (i.e. overprinting) of these primary colours allow for additional colours to appear. By way of example, printing Cyan over Yellow creates Green; printing Magenta over Yellow creates Red; printing Cyan over Magenta creates Blue; and so on. If only pure, transparent Cyan, pure transparent Magenta, and pure transparent Yellow were used, without applying tones, a maximum of seven apparent colours would be observable, including Black, if all colours were mixed together, as illustrated in the colour diagram of FIG. 13.

In practice, a dark black colour is difficult to achieve using only CMY and hence a Black ink is added. With both CMYK and CMYKOGV/CMYKRGB, or any other process ink system, transparent primary colours are used to create full colour images by printing different colours over each other. For these printing systems and processes to work, it is very important that a first printed ink colour properly dries before a next ink colour is deposited over the first ink colour. If the inks are not properly dried, trapping is poor, which means that one ink repels the other ink, leading to a lack of apparent, secondary trapping colours. Alternatively, wet inks contaminate each other and/or a printed substrate. Moreover, the requirement to trap inks when printing full colour images, may lead to use of an excessive amount of ink printed onto a substrate. Some substrates, such as newspaper or tissue paper, may not be tolerant of high ink coverage, which makes colour printing onto such substrates challenging.

In certain printing processes, such as Dry Offset Letterpress, an inked image is transferred (or "offset") from a printing plate onto a rubber blanket, and from the rubber blanket onto a printing substrate surface. In these processes, all the inks are transferred onto the rubber blanket in a wet state before being transferred onto the substrate, and the inks are transferred onto the printed substrate simultaneously for the sake of accurate registration. Drying of the inks, once transferred onto the substrate, subsequently takes place under a UV light and/or heat source. Major problems associated with Dry Offset Letterpress printing are that, since the printing inks are deposited onto the rubber blanket in a wet state, they cross-contaminate each other, or simply don't transfer properly onto the blanket or substrate, or don't create the expected trapping colours.

It is known in the prior art to digitally separate images, objects or colours to be printed in full colour, into CMYK or CMYKOGV or CMYKRGB channels, each corresponding to an ink that will be used. This is typically done at a bit depth or bit level of 8 or more (greyscale). Bit depth or bit level can be explained as follows. Referring to the colour diagram above, by using only pure Cyan, Magenta and Yellow, a maximum of seven different colours can be created. However, if one were to mix 256 shades of Cyan, 256 shades of Magenta, and 256 shades of Yellow, one would be able to create 16.8 million different colours. That is exactly what you get with an 8-bit image for example—256 shades of red, 256 shades of green, and 256 shades of blue, which when trapping each other, collectively create millions of possible colours typically present in an 8-bit CMY(K) file on a computer.

The number 256 is mathematically arrived at as follows: 1-bit equals 2. Moving beyond 1-bit, bit value is calculated by the expression "2 to the exponent (however many bits there are)". So, for example, the value of 2-bits is calculated as "2 to the exponent 2", which equals 4. So 2-bits equals 4. A 4-bit image would be "2 to the exponent 4", which is 16. So 4-bits equals 16. Therefore, an 8-bit image would be "2 to the exponent 8", which is 256. This means that for, say the colour Cyan, a 1-bit image, when displayed without applying cyan colouring, would be a pure black-and-white image only having no shades of grey; whereas an 8-bit image would be a grayscale image comprising 256 shades of grey.

Figure 14A:
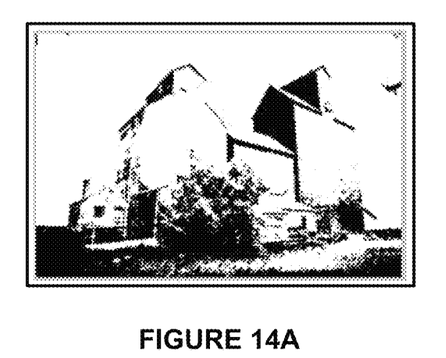
FIGS. 14A and 14B are exemplary images showing only two tones represented by a bit depth of 1 and grey tones represented by a bit depth of 8, respectively.

Explained alternatively, for each pixel in an image, grey-scale tonal value or level of the pixel is stored in an electronic image file. Bit depth refers to how many digits the tonal information for each pixel is stored in. For a bit depth of 1, one digit would store how light or dark each aspect of a scene was, and since the only possible 2 values for a bit depth of 1 would be 0 and 1, and the only two tones that could be represented are black and white, as illustrated in the black-and-white image of FIG. 14A.

Figure 14B:
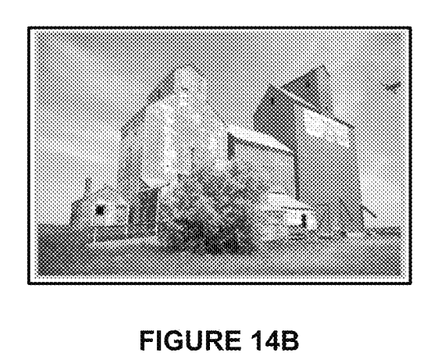

By comparison, a bit depth of 8 provides for 256 shades of grey, which means that the image could then be displayed as illustrated in the greyscale image of FIG. 14B.

SUMMARY OF THE INVENTION

In full colour process printing, a digital image, graphic object or colour is, as is common in the industry, created in CMYK, or converted from RGB, CMYK or Spot Colour to CMYK or CMYKOGV or CMYKRGB. Such a digital file has its ink colour channels initially as continuous tone greyscale images of a bit depth of 8 or more and most frequently contains ink traps. Upon conversion to 1-bit colour depth, for the purpose of outputting printing plates or printing with a digital printer, ink traps remain.

According to the invention there is provided a method of colour separation and printing a full colour image, directly onto a substrate, in the absence of ink traps and without requiring ink drying between ink stations, the method providing the steps of— using non-transparent, semi-transparent, or transparent inks;
half-toning (i.e. screening) separated CMYK digital image files to 1-bit files;
creating additional ink colour channels from the 1-bit CMYK separated files; and
performing removal of trapped or inked areas that will be overprinted in respect of all colours by utilising the 1 bit files.

The separated CMYK digital images files may be half-toned or screened to 1-bit files by using either amplitude modulated, frequency modulated, dithering, or stochastic screening patterns or a combination of the aforementioned, to create four (4) colour separations, namely Cyan, Magenta, Yellow and Black. In particular, the four (4) colour channels are created as individual 1-bit files of Black-and-White screened bitmaps available as both positive and negative image files.

The method further provides the step of performing removal of trapped or inked areas that will be overprinted, as well as a second colour separation in order to remove ink traps and create unique separations for all trapping areas on an image file. In particular, the method provides the following steps of achieving this outcome:

Black (K) positive separation is merged with Cyan (C) negative separation so as to create a new Cyan (C) negative separation, where under-printing portions of Cyan (C) ink (that would have printed under or over Black (K)) is thus removed from the Cyan (C) separation;
Black (K) positive separation is merged with Magenta (M) negative separation so as to create a new Magenta (M) negative separation, where under-printing portions of Magenta (M) ink (that would have printed under or over Black (K)) is thus removed from the Magenta (M) separation;
Black (K) positive separation is merged with Yellow (Y) negative separation so as to create a new Yellow (Y) negative separation, where under-printing portions of Yellow (Y) ink (that would have printed under or over Black (K)) is thus removed from the Yellow (Y) separation;

The Magenta (M) and Yellow (Y) negatives are superimposed over each other to create a new 1-bit colour separation Red (R);
The negative Red (R) separation is inverted to create a positive Red (R) separation;
The positive Red (R) separation is now superimposed onto the negative Yellow (Y) separation and inverted to create a Yellow (Y) positive separation, where under-printing portions of Yellow (Y) ink (that would have printed under or over Red (R)) has been removed from the Yellow (Y) separation (i.e. Y-R);
The positive Red (R) separation is now superimposed onto the negative Magenta (M) separation and inverted to create a Magenta (M) positive separation where under-printing portions of Magenta (M) ink (that would have printed under or over Red (R)) has been removed from the Magenta (M) separation (i.e. M-R);
The Cyan (C) and Yellow (Y) negatives are superimposed over each other to create a new 1 bit colour separation Green (G);
The negative Green (G) separation is now inverted to create a positive Green (G) separation;
The positive Green (G) separation is then superimposed onto the negative Cyan (C) separation and inverted to create a Cyan (C) positive separation where under-printing portions of Cyan (C) ink (that would have printed under or over Green (G)) has been removed from the Cyan (C) separation (i.e. C-G);
The positive Green (G) separation is now superimposed onto the negative Yellow (Y) separation and inverted to create a Yellow (Y) positive separation where under-printing portions of Yellow (Y) ink (that would have printed under or over Green (G)) has been removed from the Yellow (Y) separation (i.e. Y-G);
The Cyan (C) and Magenta (M) negatives are superimposed over each other to create a new 1 bit colour separation Blue (B);
The negative Blue (B) separation is now inverted to create a positive Blue (B) separation;
The positive Blue (B) separation is then superimposed onto the negative Cyan (C) separation and inverted to create a Cyan (C) positive separation where under-printing portions of Cyan (C) ink (that would have printed under or over Blue (B)) has been removed from the Cyan (C) separation (i.e. C-B);
The positive Blue (B) separation is now superimposed onto the negative Magenta (M) separation and inverted to create a Magenta (M) positive separation where under-printing portions of Magenta (M) ink (that would have printed under or over Blue (B)) has been removed from the Magenta (M) separation (i.e. M-B);
The positive C-G and positive C-B are inverted to negative and superimposed on each other and then inverted again to a single positive file (C-GB);
The positive M-R and positive M-B are inverted to negative and superimposed on each other and then inverted again to a single positive file (M-RB);
The positive Y-R and positive Y-G are inverted to negative and superimposed on each other and then inverted again to a single positive file (Y-RG);
Red (R)+Green (G)+Blue (B) negatives are now superimposed on each other to find areas where RGB trapping occurs and a new file is created (i.e. RGB-Trap);
The RGB-Trap is then inverted to a positive file;
The positive RGB-Trap separation is now superimposed onto the negative Red (R) separation and inverted to create a Red (R) positive separation where underprinting portions of GB ink (that would have printed under or over Red (R)) has been removed from the Red (R) separation (i.e. R-GB);

The positive RGB-Trap separation is then superimposed onto the negative Green (G) separation and inverted to create a Green (G) positive separation where under-printing portions of RB ink (that would have printed under or over Green (G)) has been removed from the Green (G) separation (i.e. G-RB);

The positive RGB-Trap separation is now superimposed onto the negative Blue (B) separation and inverted to create a Blue (B) positive separation where under-printing portions of RG ink (that would have printed under or over Blue (B)) has been removed from the Blue (B) separation (i.e. B-RG);

The positive RGB-Trap separation is now superimposed on the positive Black (K) separation to create a Black (K) positive separation where the RGB-Trap has been added to the Black (K) separation (i.e. K+RGBTrap);

K+RGBTrap, R-GB, G-RB, B-RG, C-GB, M-RB, Y-RG are now kept and renamed Black, Red, Green, Blue, Cyan, Magenta and Yellow respectively.

The resulting 7 separations do not overlap, create traps, or overprint in any way. The CMYK separations are printed with industry standard CMYK inks and the Red-Green-Blue (i.e. RGB) inks may be formulated to resemble traditional trap colours.

Since process inks are not entirely transparent in practise, the visible colour gamut may be increased by allowing the selection of higher chroma versions of the appropriate RGB inks.

The transparent, semi-transparent or non-transparent inks may include opaque, metallic and fluorescent printing inks, which may dramatically reduce the effect of substrate colour or condition on a final printed image.

The method may be characterised therein that a full colour image is created using no more than 100% Total Area Coverage ("TAC") or Tone Value Sum of ink. It will be appreciated that full colour images from traditional CMYK printing typically have a TAC in portions of the image of 270% and more. As a result, for all printing processes, whether it be digital or conventional, ink savings may be achieved with the method of the invention. Since no inter-station drying of printing inks is required, presses printing with the method of the invention may be built more affordably and run faster, where press speed is otherwise limited by drying considerations.

According to a further aspect of the invention, there is provided a method of colour separation and printing a full colour image, directly onto a substrate, the method being characterised by performing removal of trapped areas that will be overprinted, as well as second colour separation in order to remove traps and create unique separations for all trapping areas on an image file, through the following steps, namely—

Black (K) positive separation is merged with Cyan (C) negative separation so as to create a new Cyan (C) negative separation, where under-printing portions of Cyan (C) (that would have printed under or over Black (K)) is thus removed from the Cyan (C) separation;

Black (K) positive separation is merged with Magenta (M) negative separation so as to create a new Magenta (M) negative separation, where under-printing portions of Magenta (M) (that would have printed under or over Black (K)) is thus removed from the Magenta (M) separation;

Black (K) positive separation is merged with Yellow (Y) negative separation so as to create a new Yellow (Y) negative separation, where under-printing portions of Yellow (Y) (that would have printed under or over Black (K)) is thus removed from the Yellow (Y) separation;

The Magenta (M) and Yellow (Y) negatives are superimposed over each other to create a new 1-bit colour separation Red (R);

The negative Red (R) separation is inverted to create a positive Red (R) separation;

The positive Red (R) separation is now superimposed onto the negative Yellow (Y) separation and inverted to create a Yellow (Y) positive separation, where under-printing portions of Yellow (Y) (that would have printed under or over Red (R)) has been removed from the Yellow (Y) separation (i.e. Y-R);

The positive Red (R) separation is now superimposed onto the negative Magenta (M) separation and inverted to create a Magenta (M) positive separation where under-printing portions of Magenta (M) (that would have printed under or over Red (R)) has been removed from the Magenta (M) separation (i.e. M-R);

The Cyan (C) and Yellow (Y) negatives are superimposed over each other to create a new 1 bit colour separation Green (G);

The negative Green (G) separation is now inverted to create a positive Green (G) separation;

The positive Green (G) separation is then superimposed onto the negative Cyan (C) separation and inverted to create a Cyan (C) positive separation where under-printing portions of Cyan (C) (that would have printed under or over Green (G)) has been removed from the Cyan (C) separation (i.e. C-G);

The positive Green (G) separation is now superimposed onto the negative Yellow (Y) separation and inverted to create a Yellow (Y) positive separation where under-printing portions of Yellow (Y) (that would have printed under or over Green (G)) has been removed from the Yellow (Y) separation (i.e. Y-G);

The Cyan (C) and Magenta (M) negatives are superimposed over each other to create a new 1 bit colour separation Blue (B);

The negative Blue (B) separation is now inverted to create a positive Blue (B) separation;

The positive Blue (B) separation is then superimposed onto the negative Cyan (C) separation and inverted to create a Cyan (C) positive separation where under-printing portions of Cyan (C) (that would have printed under or over Blue (B)) has been removed from the Cyan (C) separation (i.e. C-B);

The positive Blue (B) separation is now superimposed onto the negative Magenta (M) separation and inverted to create a Magenta (M) positive separation where under-printing portions of Magenta (M) (that would have printed under or over Blue (B)) has been removed from the Magenta (M) separation (i.e. M-B);

The positive C-G and positive C-B are inverted to negative and superimposed on each other and then inverted again to a single positive file (C-GB);

The positive M-R and positive M-B are inverted to negative and superimposed on each other and then inverted again to a single positive file (M-RB);

The positive Y-R and positive Y-G are inverted to negative and superimposed on each other and then inverted again to a single positive file (Y-RG);

Red (R)+Green (G)+Blue (B) negatives are now superimposed on each other to find areas where RGB trapping occurs and a new file is created (i.e. RGB-Trap);

The RGB-Trap is then inverted to a positive file;

The positive RGB-Trap separation is now superimposed onto the negative Red (R) separation and inverted to create a Red (R) positive separation where underprinting portions of GB (that would have printed under or over Red (R)) has been removed from the Red (R) separation (i.e. R-GB);

The positive RGB-Trap separation is then superimposed onto the negative Green (G) separation and inverted to create a Green (G) positive separation where underprinting portions of RB (that would have printed under or over Green (G)) has been removed from the Green (G) separation (i.e. G-RB);

The positive RGB-Trap separation is now superimposed onto the negative Blue (B) separation and inverted to create a Blue (B) positive separation where underprinting portions of RG (that would have printed under or over Blue (B)) has been removed from the Blue (B) separation (i.e. B-RG);

The positive RGB-Trap separation is now superimposed on the positive Black (K) separation to create a Black (K) positive separation where the RGB-Trap has been added to the Black (K) separation (i.e. K+RGBTrap);

K+RGBTrap, R-GB, G-RB, B-RG, C-GB, M-RB, Y-RG are now kept and renamed Black, Red, Green, Blue, Cyan, Magenta and Yellow respectively;

the method being characterised therein that the resulting 7 separations do not overlap, create traps, or overprint in any way.

The method of the invention provides that a White Positive Separation may be created by superimposing all positive separations of CMYKRGB and then inverting it to a negative. Moreover, the method, which results in a fixed, predetermined colour palette of separations (i.e. CMYKRGB and White, if required), includes the step of combining these separations to create an indexed colour file to manage and limit colours in digital files in order to reduce file size.

The method of the invention includes printing full colour images, directly onto a substrate, by using solid materials, laminates, films or fibres. In particular, these solid materials may include plastics, polymers, fibres, films, laminates, foils, toners, pigments and tiles, coloured CMYKRGB (and White where required) and separated according to the method of the invention.

BRIEF DESCRIPTION OF THE ACCOMPANYING DRAWINGS

The patent or application file contains at least one drawing executed in colour. Copies of this patent or patent application publication with colour drawing(s) will be provided by the Office upon request and payment of the necessary fee.

Without wishing to be bound by it, the invention will now further be described and illustrated with reference to the accompanying non-limiting representations and by way of example only. It is reiterated that, with the exception of FIG. 2, all the accompanying representations are depicted in colour, since colour separation, full colour printing, colour illustration, colour representation and colour manipulation are essential features and at the very core of the invention. In the accompanying representations—

DETAILED DESCRIPTION OF THE EXEMPLARY EMBODIMENTS

Figure 1:
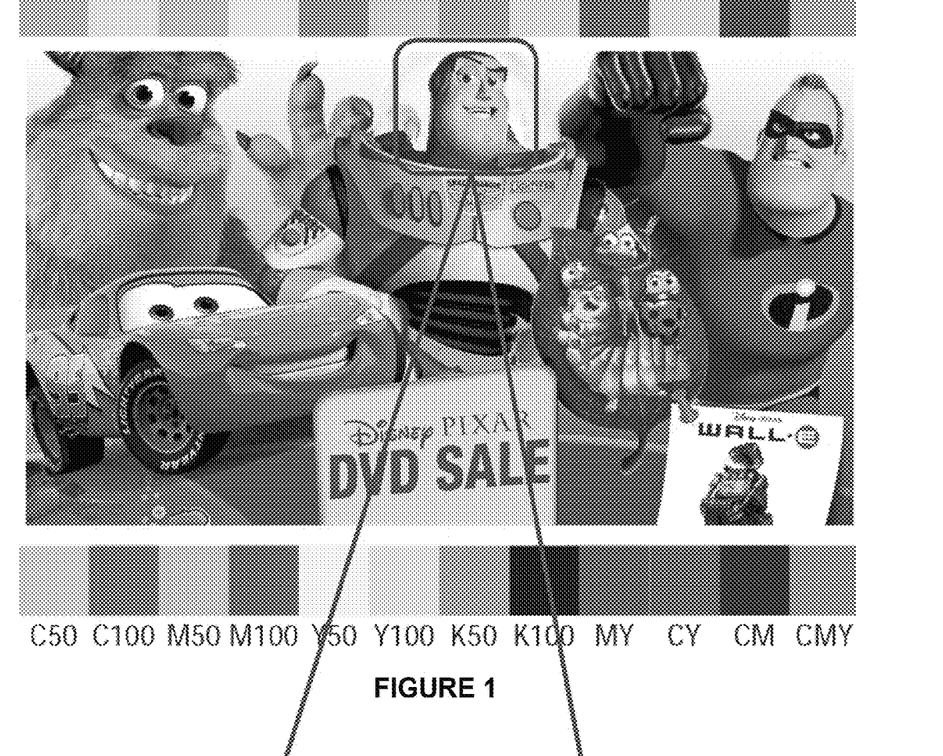
FIG. 1 illustrates a prior art 8 bit (or more) digital CMYK image file with 4 greyscale channels, with each channel representing a transparent ink colour of Cyan, Magenta, Yellow and Black (i.e. prior art)
Figure 2:
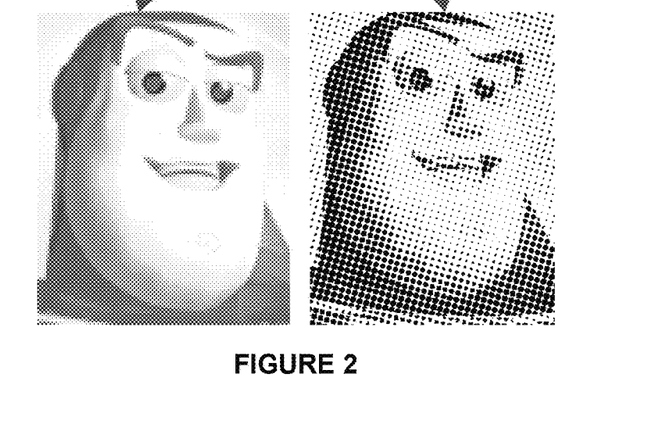
FIG. 2 illustrates the Cyan channel only, as it would appear in 8-bit colour depth on the left and 1-bit colour depth after halftoning on the right (not coloured by Cyan ink) of a small portion of the CMYK file of FIG. 1 (enlarged from the FIG. 1 file) (i.e. prior art)

With reference to the prior art images, such as FIG. 2, before platemaking for conventional printing presses, or at some point prior to depositing ink onto a digital press, 8 bit files (or greater) greyscale colour channels are converted to 1 bit (Black-and-White) files. Tonality is retained with a screening or halftoning technique. Different halftone or screening techniques exist in that halftone dots or screens may simulate grey levels or tonality via amplitude or frequency, sometimes referred to as periodic or non-periodic screens. The benefits of the current invention can be achieved with any halftone screening technique or dithering. All of the illustrated Figures use one such technique, namely conventional Amplitude Modulated Screening, also referred to as Periodic Screens.

Figure 3:
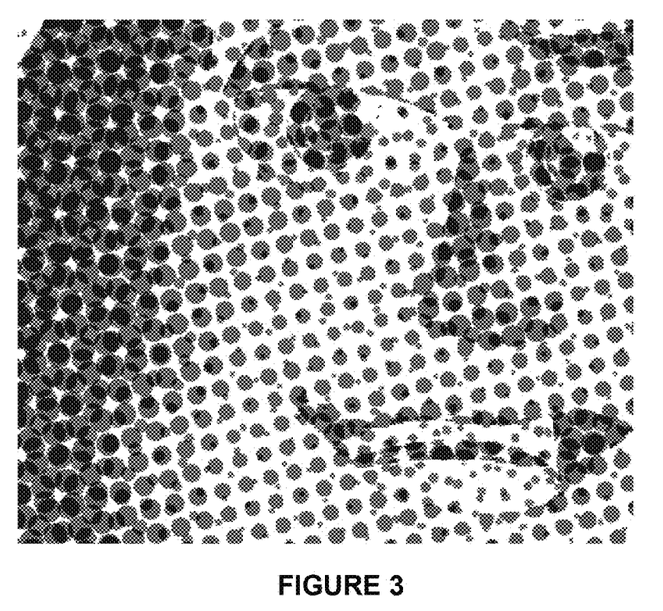
FIG. 3 illustrates a further enlarged view of FIG. 2, after conversion to 1 bit halftone files, where Magenta ink has been printed over Cyan ink, illustrating the resulting trapping ink colour of blue where traps occur (i.e. prior art)
Figure 4:
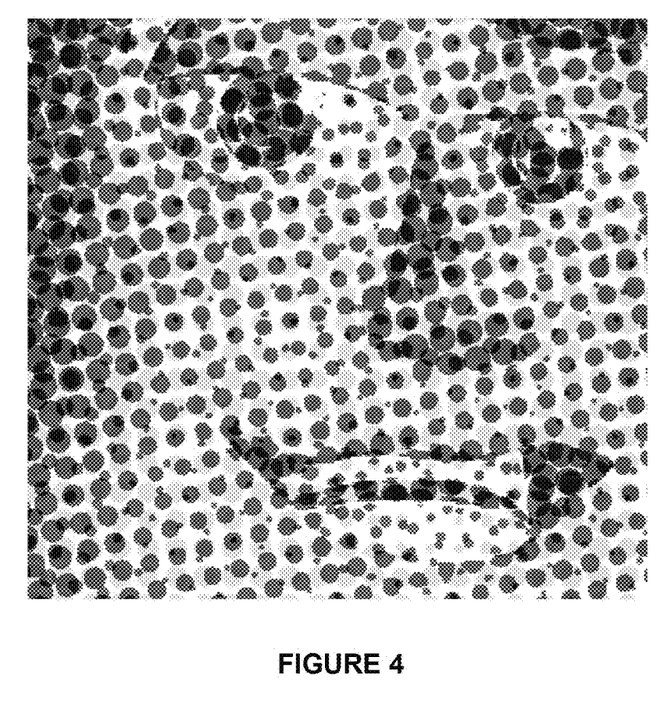
FIG. 4 illustrates an enlarged view of FIG. 2, where Cyan (C) and Magenta (M) inks have been printed over Yellow (Y) ink to create Green, Red, Blue and Black.
Figure 5:
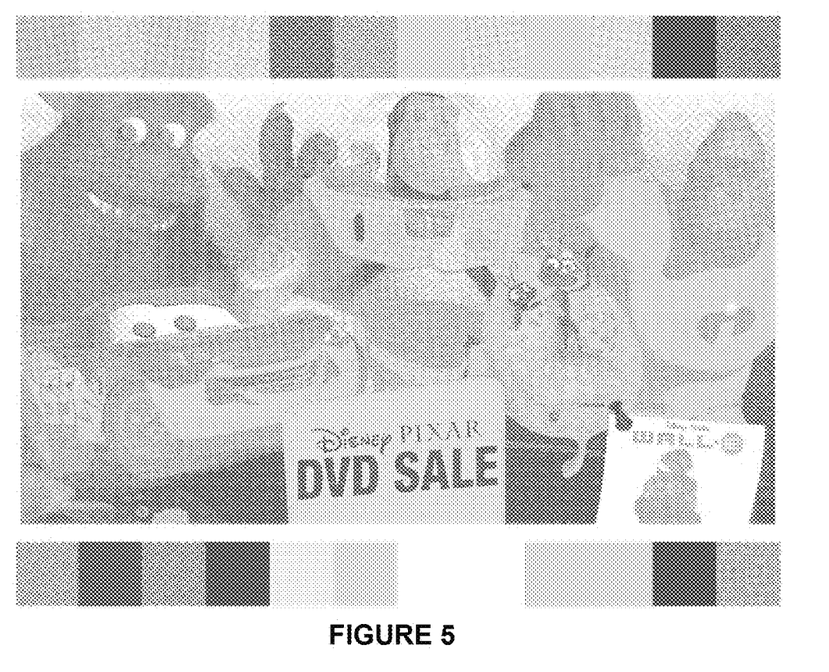
FIG. 5 illustrates what the image of FIG. 1 would look like if that image were printed with non-transparent inks (excluding black), in a particular sequence, according to prior art printing processes, or if the inks repelled each other, for example due to insufficient drying (i.e. prior art)
Figure 6:
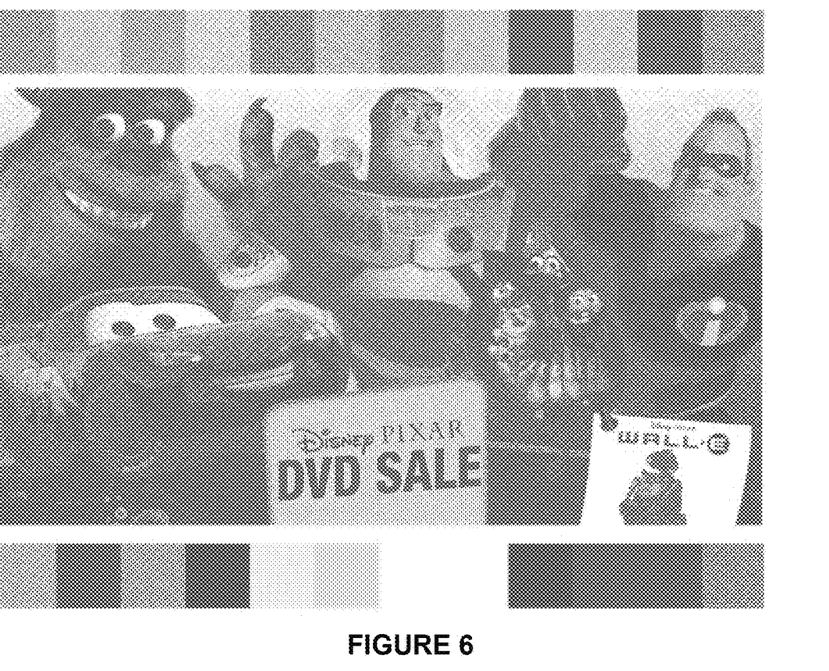
FIG. 6 illustrates another example of what the image of FIG. 1 would look like if that image were printed with non-transparent inks (excluding black), in a particular sequence, according to a different prior art ink printing sequence (i.e. prior art)
Figure 7:
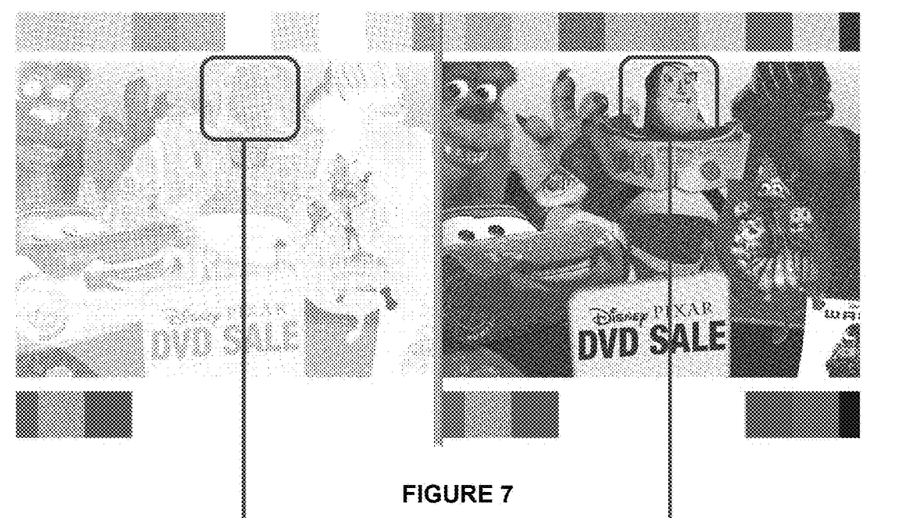
FIG. 7 is a comparative illustration of the same image, printed with Cyan and Magenta channels only, where in the image on the left is printed according to the method of the invention, and the image on the right is printed according to a prior art printing sequence.
Figure 8:
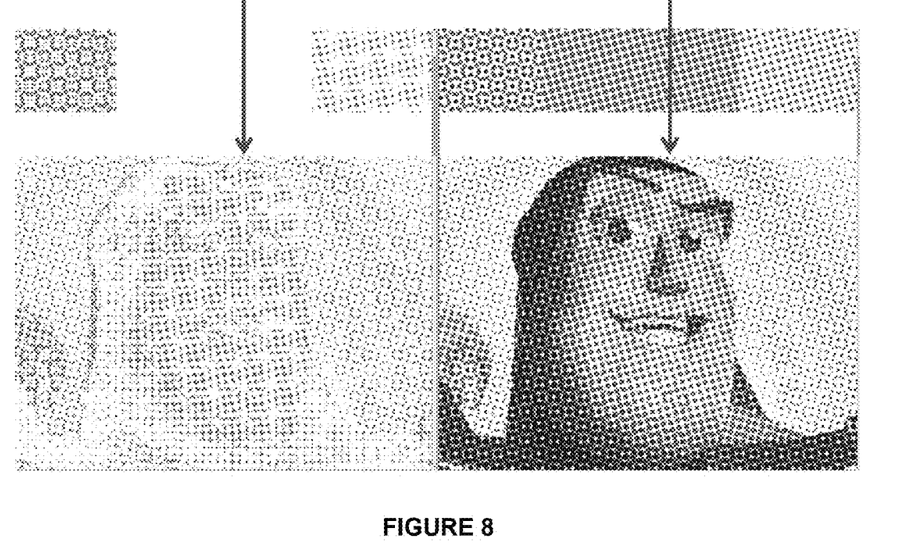
FIG. 8 illustrates enlarged views of a portion of the images of FIG. 7.

FIG. 3 illustrates an example where Magenta ink has been printed over Cyan ink with the use of transparent inks, according to the prior art. Due to the transparent characteristics of process printing inks, where the two inks overlap an additional colour, with a hue angle somewhere between Cyan and Magenta, appears. It is Blue in appearance in the illustrated prior art image.

With reference to the images that are printed according to the method of the invention (refer FIGS. 7-11), it is important to note that whether process inks are transparent or not, and whether the inks repel each other or not, the end result is the same, since the inks do not print on top of each other when printed in register. The images illustrate that the printed inks never trap.

Figure 9:
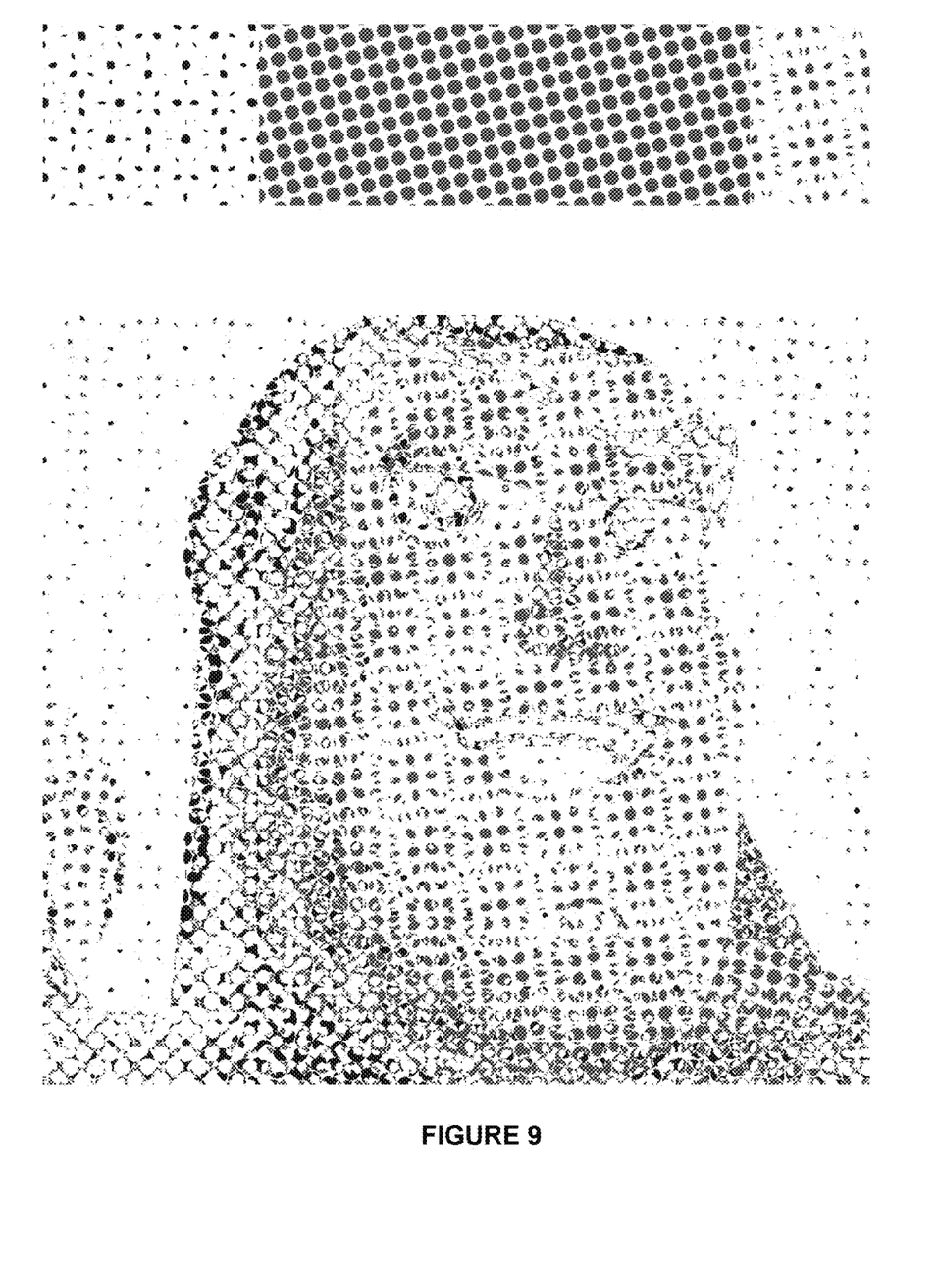
FIG. 9 illustrates the image of FIG. 8, printed with the RGB channels only, according to the method of the invention.
Figure 10:
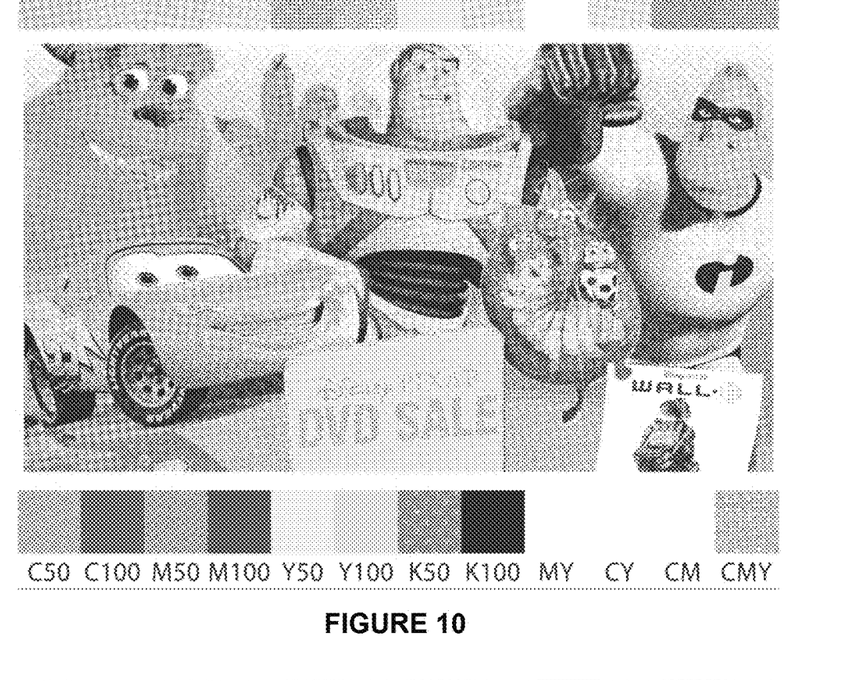
FIG. 10 illustrates the CMYK separations for the image of FIG. 1 according to the method of the invention.
Figure 11:
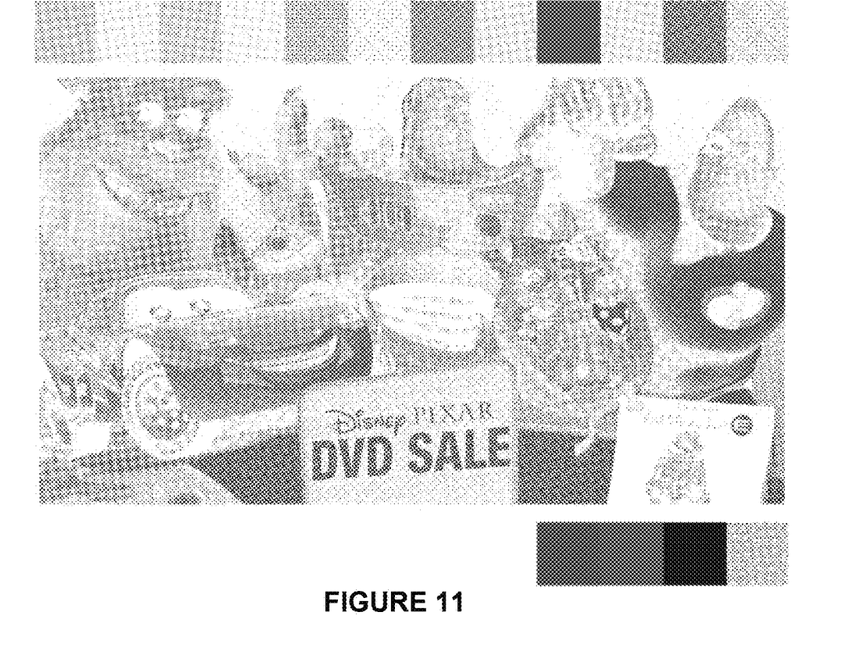
FIG. 11 illustrates the RGB separations for the image of FIG. 1 according to the method of the invention.
Figure 12:
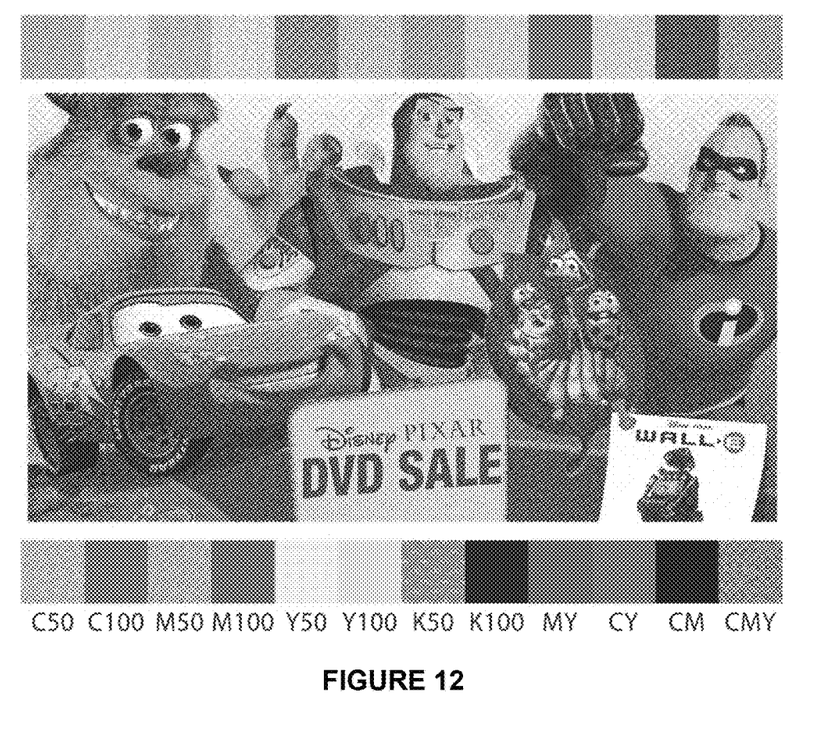
FIG. 12 illustrates CMYKRGB colour separations that have been screened and created according to the method of the invention at 120 lpi to a 1 bit file with no inks overprinting.

Referring to FIG. 9, Red, Green and Blue colours are created as separate channels, each printed with a corresponding ink. The end result is a full colour image without any ink traps. FIG. 9 illustrates the RGB channels. It is important to note that these channels are created subsequent to 1 bit files being made.

The invention enables colour separation of images that can be printed in full colour without requiring ink traps (i.e. overprints) of primary colours. This enables full colour printing where inks are deposited onto each other in a "wet" state, prior to drying, such as when printing with Dry Offset Letterpress onto aluminium cans or plastic pails and cups. It also enables the use of opaque printing inks, where a lack of substrate whiteness would otherwise have a negative effect on colour appearance if transparent process inks were used and printed directly onto the substrate; or where inks themselves have opaque characteristics due to the nature of their formulation.

Another application of the invention is that it may allow for the intentional formulation of printing inks that repel each other (in a wet or dry state), yet still enable full colour printing. In such instances, an over or under exposure or morphological filter (minimum or maximum) could be applied to CMYKRGB 1-bit separations created in the method described, to create minimal and consistent trapping for the purpose of avoiding substrate show-through as a result of printing registration errors, and then relying on the phobic properties of the respective primary inks to cause an adjustment in the positioning of the wet ink with respect to itself or other inks previously deposited onto a printing blanket or substrate, with the result that inks flow toward substrate show-through and improve perceived register between primaries.

Other embodiments of the invention are possible without departing from the spirit or scope of the invention as defined in the claims.

The invention claimed is:

1. A method of colour separation and printing a full colour image, directly onto a substrate, in the absence of ink traps and without requiring ink drying between ink stations, the method providing the steps of—
   using non-transparent, semi-transparent, or transparent inks;
   half-toning (i.e. screening) separated CMYK digital image files to 1-bit files;
   creating additional ink colour channels from the 1-bit CMYK separated files; and
   performing removal of trapped or inked areas that will be overprinted utilising the 1 bit files.

2. The method according to claim 1 wherein the separated CMYK digital images files are half-toned or screened to 1-bit files by using either amplitude modulated, frequency modulated, dithering, or stochastic screening patterns, or a combination of the aforementioned, to create four (4) colour separations, namely Cyan, Magenta, Yellow and Black.

3. The method according to claim 1 wherein the four (4) colour channels are created as individual 1-bit files of Black-and-White screened bitmaps available as both positive and negative image files.

4. The method according to claim 1 wherein the method further provides the step of performing removal of trapped or inked areas that will be overprinted, as well as second colour separation in order to remove ink traps and create unique separations for all trapping areas on an image file.

5. The method according to claim 4 wherein the method provides the following steps of achieving this outcome:
   Black (K) positive separation is merged with Cyan (C) negative separation so as to create a new Cyan (C) negative separation, where under-printing portions of Cyan (C) ink (that would have printed under or over Black (K)) is thus removed from the Cyan (C) separation;
   Black (K) positive separation is merged with Magenta (M) negative separation so as to create a new Magenta (M) negative separation, where under-printing portions of Magenta (M) ink (that would have printed under or over Black (K)) is thus removed from the Magenta (M) separation;
   Black (K) positive separation is merged with Yellow (Y) negative separation so as to create a new Yellow (Y) negative separation, where under-printing portions of Yellow (Y) ink (that would have printed under or over Black (K)) is thus removed from the Yellow (Y) separation;
   The Magenta (M) and Yellow (Y) negatives are superimposed over each other to create a new 1-bit colour separation Red (R);
   The negative Red (R) separation is inverted to create a positive Red (R) separation;
   The positive Red (R) separation is now superimposed onto the negative Yellow (Y) separation and inverted to create a Yellow (Y) positive separation, where under-printing portions of Yellow (Y) ink (that would have printed under or over Red (R)) has been removed from the Yellow (Y) separation (i.e. Y-R);
   The positive Red (R) separation is now superimposed onto the negative Magenta (M) separation and inverted to create a Magenta (M) positive separation where under-printing portions of Magenta (M) ink (that would have printed under or over Red (R)) has been removed from the Magenta (M) separation (i.e. M-R);
   The Cyan (C) and Yellow (Y) negatives are superimposed over each other to create a new 1 bit colour separation Green (G);
   The negative Green (G) separation is now inverted to create a positive Green (G) separation;
   The positive Green (G) separation is then superimposed onto the negative Cyan (C) separation and inverted to create a Cyan (C) positive separation where under-printing portions of Cyan (C) ink (that would have printed under or over Green (G)) has been removed from the Cyan (C) separation (i.e. C-G);
   The positive Green (G) separation is now superimposed onto the negative Yellow (Y) separation and inverted to create a Yellow (Y) positive separation where under-printing portions of Yellow (Y) ink (that would have printed under or over Green (G)) has been removed from the Yellow (Y) separation (i.e. Y-G);
   The Cyan (C) and Magenta (M) negatives are superimposed over each other to create a new 1 bit colour separation Blue (B);

The negative Blue (B) separation is now inverted to create a positive Blue (B) separation;

The positive Blue (B) separation is then superimposed onto the negative Cyan (C) separation and inverted to create a Cyan (C) positive separation where under-printing portions of Cyan (C) ink (that would have printed under or over Blue (B)) has been removed from the Cyan (C) separation (i.e. C-B), The positive Blue (B) separation is now superimposed onto the negative Magenta (M) separation and inverted to create a Magenta (M) positive separation where under-printing portions of Magenta (M) ink (that would have printed under or over Blue (B)) has been removed from the Magenta (M) separation (i.e. M-B);

The positive C-G and positive C-B are inverted to negative and superimposed on each other and then inverted again to a single positive file (C-GB);

The positive M-R and positive M-B are inverted to negative and superimposed on each other and then inverted again to a single positive file (M-RB);

The positive Y-R and positive Y-G are inverted to negative and superimposed on each other and then inverted again to a single positive file (Y-RG);

Red (R)+Green (G)+Blue (B) negatives are now superimposed on each other to find areas where RGB trapping occurs and a new file is created (i.e. RGB-Trap);

The RGB-Trap is then inverted to a positive file;

The positive RGB-Trap separation is now superimposed onto the negative Red (R) separation and inverted to create a Red (R) positive separation where under-printing portions of GB ink (that would have printed under or over Red (R)) has been removed from the Red (R) separation (i.e. R-GB);

The positive RGB-Trap separation is then superimposed onto the negative Green (G) separation and inverted to create a Green (G) positive separation where under-printing portions of RB ink (that would have printed under or over Green (G)) has been removed from the Green (G) separation (i.e. G-RB);

The positive RGB-Trap separation is now superimposed onto the negative Blue (B) separation and inverted to create a Blue (B) positive separation where under-printing portions of RG ink (that would have printed under or over Blue (B)) has been removed from the Blue (B) separation (i.e. B-RG);

The positive RGB-Trap separation is now superimposed on the positive Black (K) separation to create a Black (K) positive separation where the RGB-Trap has been added to the Black (K) separation (i.e. K+RGBTrap);

K+RGBTrap, R-GB, G-RB, B-RG, C-GB, M-RB, Y-RG are now kept and renamed Black, Red, Green, Blue, Cyan, Magenta and Yellow respectively;

the method being characterised therein that the resulting 7 separations do not overlap, create traps, or overprint in any way.

6. The method according to claim 5 wherein the CMYK separations are printed with industry standard CMYK inks and the Red-Green-Blue (i.e. RGB) inks are formulated to resemble traditional trap colours.

7. The method according to claim 6 wherein the visible colour gamut is increased by allowing the selection of higher chroma versions of the appropriate RGB inks.

8. The method according to claim 1 wherein the transparent, semi-transparent or non-transparent inks include opaque, metallic and fluorescent printing inks, which dramatically reduce the effect of substrate colour or condition on a final printed image.

9. The method according to claim 1 wherein the method is characterised therein that a full colour image is created using no more than 100% Total Area Coverage ("TAC") or Tone Value Sum of ink.

10. A method of colour separation and printing a full colour image, directly onto a substrate, the method being characterised by performing removal of trapped areas that will be overprinted, as well as second colour separation in order to remove traps and create unique separations for all trapping areas on an image file, through the following steps, namely—

Black (K) positive separation is merged with Cyan (C) negative separation so as to create a new Cyan (C) negative separation, where under-printing portions of Cyan (C) (that would have printed under or over Black (K)) is thus removed from the Cyan (C) separation;

Black (K) positive separation is merged with Magenta (M) negative separation so as to create a new Magenta (M) negative separation, where under-printing portions of Magenta (M) (that would have printed under or over Black (K)) is thus removed from the Magenta (M) separation;

Black (K) positive separation is merged with Yellow (Y) negative separation so as to create a new Yellow (Y) negative separation, where under-printing portions of Yellow (Y) (that would have printed under or over Black (K)) is thus removed from the Yellow (Y) separation;

The Magenta (M) and Yellow (Y) negatives are superimposed over each other to create a new 1-bit colour separation Red (R);

The negative Red (R) separation is inverted to create a positive Red (R) separation;

The positive Red (R) separation is now superimposed onto the negative Yellow (Y) separation and inverted to create a Yellow (Y) positive separation, where under-printing portions of Yellow (Y) (that would have printed under or over Red (R)) has been removed from the Yellow (Y) separation (i.e. Y-R);

The positive Red (R) separation is now superimposed onto the negative Magenta (M) separation and inverted to create a Magenta (M) positive separation where under-printing portions of Magenta (M) (that would have printed under or over Red (R)) has been removed from the Magenta (M) separation (i.e. M-R);

The Cyan (C) and Yellow (Y) negatives are superimposed over each other to create a new 1 bit colour separation Green (G);

The negative Green (G) separation is now inverted to create a positive Green (G) separation;

The positive Green (G) separation is then superimposed onto the negative Cyan (C) separation and inverted to create a Cyan (C) positive separation where under-printing portions of Cyan (C) (that would have printed under or over Green (G)) has been removed from the Cyan (C) separation (i.e. C-G);

The positive Green (G) separation is now superimposed onto the negative Yellow (Y) separation and inverted to create a Yellow (Y) positive separation where under-printing portions of Yellow (Y) (that would have printed under or over Green (G)) has been removed from the Yellow (Y) separation (i.e. Y-G);

The Cyan (C) and Magenta (M) negatives are superimposed over each other to create a new 1 bit colour separation Blue (B);

The negative Blue (B) separation is now inverted to create a positive Blue (B) separation;

The positive Blue (B) separation is then superimposed onto the negative Cyan (C) separation and inverted to create a Cyan (C) positive separation where under-printing portions of Cyan (C) (that would have printed under or over Blue (B)) has been removed from the Cyan (C) separation (i.e. C-B);

The positive Blue (B) separation is now superimposed onto the negative Magenta (M) separation and inverted to create a Magenta (M) positive separation where under-printing portions of Magenta (M) (that would have printed under or over Blue (B)) has been removed from the Magenta (M) separation (i.e. M-B);

The positive C-G and positive C-B are inverted to negative and superimposed on each other and then inverted again to a single positive file (C-GB);

The positive M-R and positive M-B are inverted to negative and superimposed on each other and then inverted again to a single positive file (M-RB);

The positive Y-R and positive Y-G are inverted to negative and superimposed on each other and then inverted again to a single positive file (Y-RG);

Red (R)+Green (G)+Blue (B) negatives are now superimposed on each other to find areas where RGB trapping occurs and a new file is created (i.e. RGB-Trap);

The RGB-Trap is then inverted to a positive file;

The positive RGB-Trap separation is now superimposed onto the negative Red (R) separation and inverted to create a Red (R) positive separation where under-printing portions of GB (that would have printed under or over Red (R)) has been removed from the Red (R) separation (i.e. R-GB);

The positive RGB-Trap separation is then superimposed onto the negative Green (G) separation and inverted to create a Green (G) positive separation where under-printing portions of RB (that would have printed under or over Green (G)) has been removed from the Green (G) separation (i.e. G-RB);

The positive RGB-Trap separation is now superimposed onto the negative Blue (B) separation and inverted to create a Blue (B) positive separation where under-printing portions of RG (that would have printed under or over Blue (B)) has been removed from the Blue (B) separation (i.e. B-RG);

The positive RGB-Trap separation is now superimposed on the positive Black (K) separation to create a Black (K) positive separation where the RGB-Trap has been added to the Black (K) separation (i.e. K+RGBTrap);

K+RGBTrap, R-GB, G-RB, B-RG, C-GB, M-RB, Y-RG are now kept and renamed Black, Red, Green, Blue, Cyan, Magenta and Yellow respectively;

the method being characterised therein that the resulting 7 separations do not overlap, create traps, or overprint in any way.

11. The method according to claim 10, wherein a White Positive Separation can be created by superimposing all positive separations of CMYKRGB and then inverting it to a negative.

12. The method according to claim 11, which results in a fixed, predetermined colour palette of separations (i.e. CMYKRGB and White, if required), including the step of combining these separations to create an indexed colour file to manage and limit colours in digital files in order to reduce file size.

13. The method according to claim 10 wherein the full colour image is printed, directly onto a substrate, by using solid materials, laminates, films or fibres.

14. The method according to claim 13 wherein the solid materials are plastics, polymers, fibres, films, laminates, foils, toners, pigments and tiles, coloured CMYKRGB (and White where required).

\* \* \* \* \*